(12) United States Patent
Shiels et al.

(10) Patent No.: US 12,336,527 B2
(45) Date of Patent: Jun. 24, 2025

(54) SELECTIVE BAIT DELIVERY APPARATUS AND METHOD FOR ANIMAL CONTROL

(71) Applicants: The United States of America as Represented by the Secretary of Agriculture, Washington, DC (US); Applied Design Corporation, Boulder, CO (US)

(72) Inventors: Aaron B. Shiels, Fort Collins, CO (US); Shane K. Vogt, Steamboat Springs, CO (US)

( * ) Notice: Subject to any disclaimer, the term of this patent is extended or adjusted under 35 U.S.C. 154(b) by 0 days.

(21) Appl. No.: 18/609,578

(22) Filed: Mar. 19, 2024

(65) Prior Publication Data

US 2024/0315233 A1 Sep. 26, 2024

Related U.S. Application Data

(60) Provisional application No. 63/453,553, filed on Mar. 21, 2023.

(51) Int. Cl.
*A01M 25/00* (2006.01)

(52) U.S. Cl.
CPC .............................. *A01M 25/004* (2013.01)

(58) Field of Classification Search
CPC ... A01M 25/00; A01M 25/002; A01M 25/004
See application file for complete search history.

(56) References Cited

U.S. PATENT DOCUMENTS

| | | | |
|---|---|---|---|
| 8,490,323 | B2 | 7/2013 | Nathan |
| 9,439,412 | B2 | 9/2016 | Kittelson |
| 10,172,342 | B2 | 1/2019 | Bolin |
| 2005/0235553 | A1 | 10/2005 | Rail |
| 2010/0115826 | A1 | 5/2010 | Kerr |
| 2018/0352801 | A1 | 12/2018 | Veber |
| 2019/0166823 | A1 | 6/2019 | Dick |

*Primary Examiner* — Richard G Davis (57) ABSTRACT

A bait station system includes an enclosure formed in part by an upper housing. The bait station system also includes a ramp that forms a bottom wall of the enclosure. The ramp moves from an initial position to an active position in response to a weight that exceeds a target animal weight threshold applied to the ramp. The bait station system also includes a bait hopper that holds bait. The bait station system further includes a bait access chamber that receives the bait from the bait hopper and that is only accessible from within the enclosure while the ramp is in the active position due to the weight applied to the ramp.

20 Claims, 10 Drawing Sheets

SELECTIVE BAIT DELIVERY APPARATUS AND METHOD FOR ANIMAL CONTROL

CROSS-REFERENCE TO RELATED APPLICATION

The present application claims the priority benefit of U.S. Provisional Patent App. No. 63/453,553 filed on Mar. 21, 2023, the entire disclosure of which is incorporated by reference herein.

BACKGROUND

Many rodents and other animals are highly destructive to crops, rangeland, and property, and several species are known to be carriers of zoonotic diseases. In addition to their destructive digging and gnawing abilities, many small animals are also known for their high reproductive rates. Estimates of costs due to invasive animals such as rodents in the U.S. alone reach $20 billion per year. There are a suite of tools and methods that have been developed to reduce such animal damage, many of which focus on population control. For example, bait traps can be used to lure an animal and then kill the animal as it attempts to extract the bait. Bait traps can also be used to perform live captures of animals. Other attempts at population control include the distribution of poison to kill the animals and/or the distribution of fertility control agents that helps to prevent reproduction of the animals.

SUMMARY

An illustrative bait station system includes an enclosure formed in part by an upper housing. The bait station system also includes a ramp that forms a bottom wall of the enclosure. The ramp moves from an initial position to an active position in response to a weight that exceeds a target animal weight threshold applied to the ramp. The bait station system also includes a bait hopper that holds bait. The bait station system further includes a bait access chamber that receives the bait from the bait hopper and that is only accessible from within the enclosure while the ramp is in the active position due to the weight applied to the ramp.

In one embodiment, the bait station system includes an opening that extends laterally through the ramp, and the opening is sized to receive a rod that acts as a fulcrum for the ramp. The system can also include a lower housing that mounts to the upper housing, where the lower housing includes openings that receive ends of the rod that acts as the fulcrum for the ramp. In another embodiment, a ramp weight is mounted to a bottom surface of the ramp. In such an embodiment, a pin can be used to secure the ramp weight to the bottom surface of the ramp. In another embodiment, a slot is formed in a bottom surface of the ramp, where the slot is sized to slidably receive the pin such that the pin and the ramp weight can be moved along the slot to adjust a position of the ramp weight to control a tipping weight for the ramp. In one embodiment, the pin includes a set screw that locks the pin and the ramp weight at a desired position. In another embodiment, one or more visual indicators are positioned along the slot, and the position of the ramp weight corresponds to a target animal identified by one of the one or more visual indicators. Another embodiment includes a lower housing that mounts to the upper housing, and one or more access openings formed in a bottom wall of the lower housing. The one or more access openings provide access to the ramp weight such that the ramp weight can be repositioned along the bottom surface of the ramp.

In another embodiment, an animal opening is formed in the upper housing that allows a target animal to enter the enclosure, and a size of the animal opening is based on a size of the target animal to prevent larger animals from entering the enclosure. In another embodiment, the system includes a first wall mounted to a distal end of the ramp, where the first wall includes an opening. In an illustrative embodiment, the opening in the first wall is adjacent to a wall of the bait access chamber when the ramp is in the initial position, and the opening in the first wall is adjacent to an opening in the bait access chamber when the ramp is in the active position. The system can also include a second wall at the distal end of the enclosure, where the second wall is adjacent to the bait hopper, and where the second wall includes one or more openings to allow scent from the bait to enter the enclosure. In another embodiment, the bait hopper includes a tapered bottom wall that causes bait to travel from the bait hopper into the bait access chamber. The system can also include a ledge that acts as a stop for a distal end of the ramp when the ramp is in the active position. In one embodiment, movement of the ramp from the initial position to the active position causes the bait hopper to release a single dose of bait into the bait access chamber.

An illustrative method of forming a bait station includes forming a portion of an enclosure by an upper housing that is attached to a lower housing. The method includes mounting a ramp to one or both of the lower housing and the upper housing such that the ramp forms a bottom wall of the enclosure. The ramp is mounted such that it is movable from an initial position to an active position in response to a weight that exceeds a target animal weight threshold applied to the ramp. The method also includes mounting a bait hopper that holds bait adjacent to the ramp. The method further includes forming a bait access chamber that receives the bait from the bait hopper, where the bait access chamber is only accessible from within the enclosure while the ramp is in the active position due the weight applied to the ramp.

In one embodiment, the method includes mounting a ramp weight to a bottom surface of the ramp such that a position of the ramp weight controls a tipping weight of the ramp. The method can also include forming a slot in the bottom surface of the ramp, where the slot is sized to slidably receive a pin that holds the ramp weight such that the pin and the ramp weight can be moved along the slot to adjust the position of the ramp weight to control the tipping weight for the ramp. In one embodiment, mounting the ramp includes forming a lateral opening through the ramp and mounting a rod through the lateral opening such that the rod acts as a fulcrum for the ramp. The method can also include forming an animal opening in the upper housing that allows a target animal to enter the enclosure, where a size of the animal opening is based on a size of the target animal to prevent larger animals from entering the enclosure.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

There are numerous different tools and methods in use to help control animal populations to reduce animal damage and prevent the spread of diseases. Many of these traditional systems focus on rodent population control. Unfortunately, most of the toxicants, fertility control agents, and vaccines that are used in traditional systems to manage animal populations are not species specific. Despite the efficacy of available ingredients on target animals, if consumed by a non-target species they can have the same, undesired effect (e.g., death, infertility, etc.). Thus, the method of delivery is of particular importance to ensure only target species receive the bait.

Some commercial bait stations are designed to exclude animals larger than a target species such as a rat, including the intentional exclusion of domestic animals (e.g., dogs, cats, livestock, etc.) and native wildlife (e.g., raccoons, deer, etc.). However, there are non-target animals, including mammals, that are smaller than the target animals (e.g., rodents) that can still access these types of bait stations (e.g., small mammals, lizards, invertebrates, etc.). These species would be at risk of exposure to toxicants, fertility control agents, and vaccines, which may prove lethal to not only them but also their predators. Preventing smaller animals from gaining access to baits in bait stations is a safer and more effective method for delivering toxicants, fertility control, and vaccines, and permits animal management control tools to be used in a more responsible fashion.

The present application focuses on a bait delivery system and method for selectively delivering toxic baits, fertility control agents, vaccines, etc. (hereinafter "bait" or "active bait") to target animal species in areas of agriculture, natural resources, and public and private lands. Selective delivery can be precisely controlled by administering active baits only to target animals while excluding other species from accessing the active baits. Selective administration of active baits is superior to other means of animal control as the baits can be more efficiently and environmentally responsibly allocated to only target species. More specifically, species-selective bait stations can improve the management of problematic wildlife by successfully delivering toxicants, contraceptives, vaccines, medicines, and other substances to the target (e.g., rodent) species while excluding access to these substances for all nontarget wildlife.

In one embodiment, an apparatus for the selective delivery of active baits to target various animal species includes a mobile platform in the form of a ramp, whose movement depends on the application of a minimum weight. For example, the mobile platform can move downward with the application of the minimum weight, and the downward position of the mobile platform causes a door/opening to provide access to the active bait.

In one embodiment, the apparatus can include a lever system that is activated by a minimum downward pressure applied to the mobile platform. In various aspects, the downward motion of the mobile platform causes the levers to become reconfigured to open a door concealing the active bait. The apparatus can include a bait hopper that holds the active bait. In one embodiment, a latch can be configured to release the active bait from the hopper into a bait access chamber. For example, the application of a minimum downward pressure causes the door/opening concealing the active bait to open to provide access to the active bait that has been released into the bait access chamber. In another embodiment, stairs can be configured beneath the mobile platform to allow access to the chamber. For example, the stairs enable a target species to climb atop the mobile platform.

As an example, a species-specific bait station can use bait to attract a target rodent or other animal to a bait station box where there is a circular-hole entrance that excludes larger non-target species. Once inside the bait station, the animal is attracted to the far end and if the weight of the animal is above a pre-set mass (i.e., a target animal weight threshold), the animal's position at the far end of the station will trigger the access to the bait access chamber through which the animal can access the bait. A nontarget animal that is below the target animal weight threshold will not be able to activate the ramp to provide access to the bait. In one embodiment, once the door is open, bait is presented and the door remains open until the animal exits the station, at which point the weight reduction of the animal leaving the bait station will cause the feeder door to immediately close. This and other embodiments are described in more detail below with reference to the figures.

Figure 1:
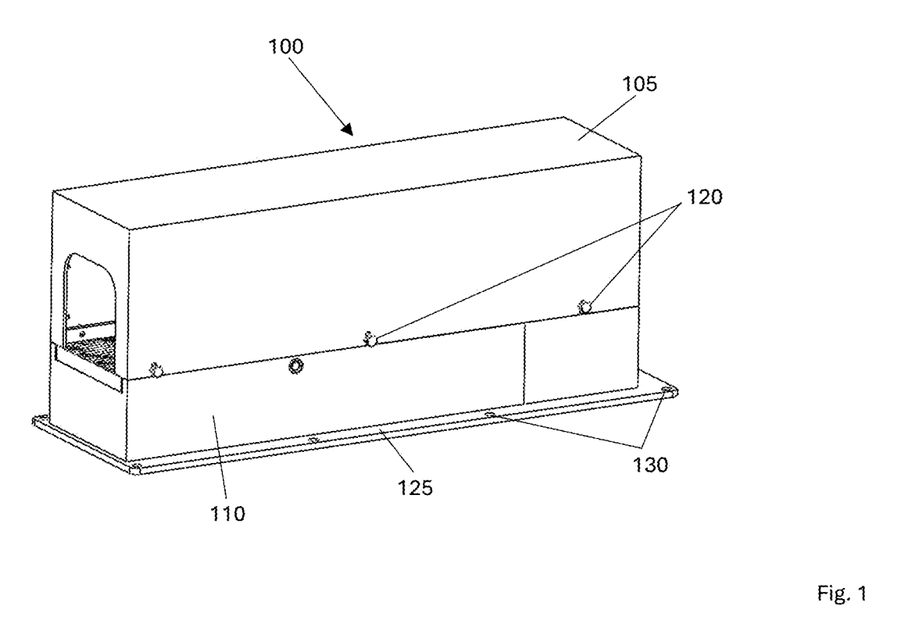
FIG. 1 is a front perspective view of a bait station in accordance with an illustrative embodiment.

FIG. 1 is a front perspective view of a bait station 100 in accordance with an illustrative embodiment. As shown, the bait station 100 includes an upper housing 105 that mounts to a lower housing 110. Included in the upper housing 105 is an animal opening 115 through which an animal is able to enter the bait station 100. In an illustrative embodiment, the animal opening 115 is sized for a specific type of target animal. Specifically, the animal opening 115 is large enough that an average-sized adult target animal can enter the bait station 100, while also being small enough to prevent animals of a larger size (than the target animal) from entering the bait station. As an example, a first size of animal opening 115 can be used if mice are the target animal, a second size of animal opening 115 (i.e., larger than the first size) can be used if red squirrels are the target animal, a third size of animal opening 115 (e.g., larger than the second size) can be used if gray squirrels are the target animal, a fourth size of animal opening 115 (i.e., larger than the third size) can be used if prairie dogs are the target animal, etc.

In the embodiment of FIG. 1, the animal opening 115 is in the shape of a rectangle with curved corners. In alternative embodiments, a different shape of the animal opening 115 may be used, such as square (with or without curved corners), circular, ovular, etc. depending on the type and size of the target animal. With respect to orientation, the animal opening 115 is positioned at a proximal end of the bait station 100 and the bait access chamber (discussed below) is positioned at a distal end of the bait station 100.

In an illustrative embodiment, the upper housing 105 is detachable from the lower housing 110. The upper housing 105 can mount to the lower housing 110 using fasteners 120, which can be screws, bolts, rivets, etc. Alternatively, the upper housing 105 can mount to the lower housing 110 via a friction fit, a snap-fit, etc. In another illustrative embodiment, the lower housing 110 includes a flange 125 that extends outward from a bottom surface thereof. The flange 125 includes a plurality of openings 130 that allow the bait station 100 to be secured (e.g., by fasteners) to a surface. In one embodiment, the flange 125 is part of a base plate that mounts underneath the lower housing 110.

Figure 2A:
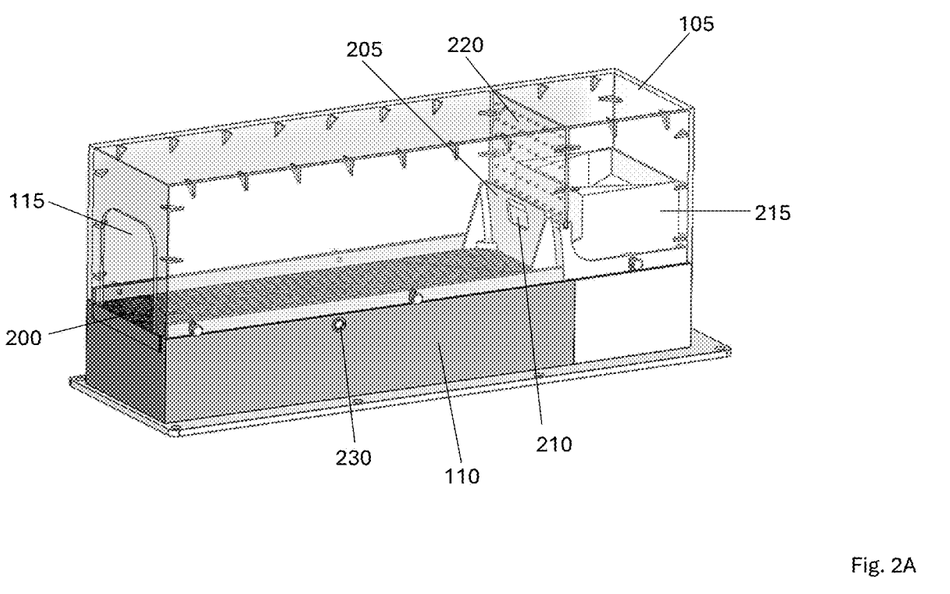
FIG. 2A is a perspective view of the bait station with a transparent upper housing such that an interior of the bait station is visible in accordance with an illustrative embodiment.
Figure 2B:
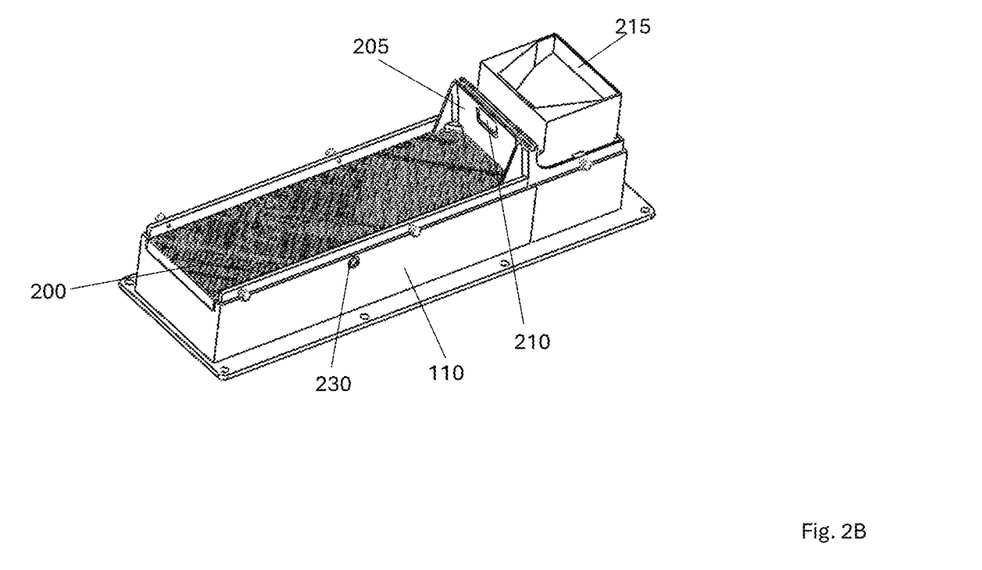
FIG. 2B is a perspective view of the bait station with the upper housing removed in accordance with an illustrative embodiment.
Figure 2C:
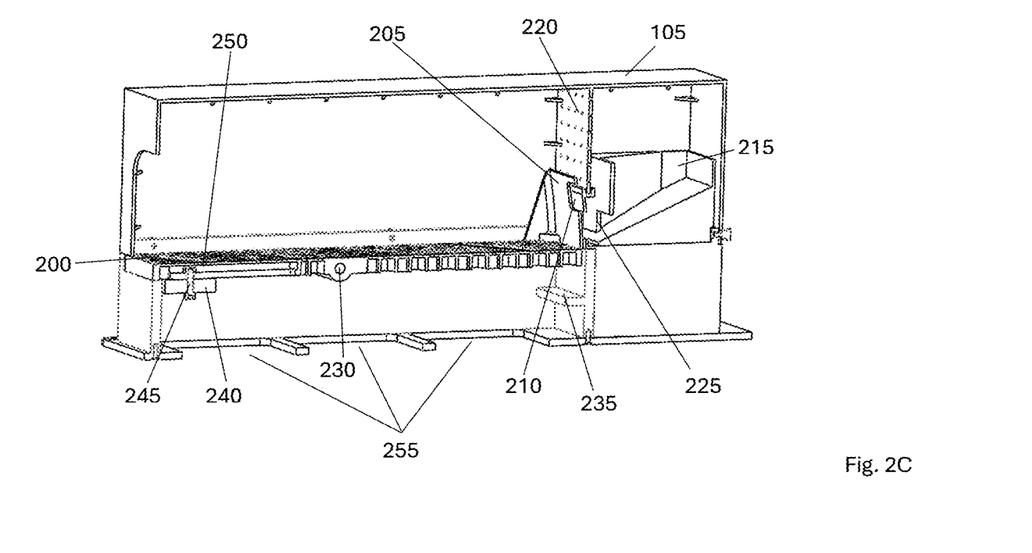
FIG. 2C is a cross-section side view of the bait station with the upper housing attached in accordance with an illustrative embodiment.

FIG. 2A is a perspective view of the bait station 100 with a transparent upper housing 105 such that an interior of the bait station is visible in accordance with an illustrative embodiment. FIG. 2B is a perspective view of the bait station 100 with the upper housing 105 removed in accordance with an illustrative embodiment. FIG. 2C is a cross-section side view of the bait station with the upper housing 105 attached in accordance with an illustrative embodiment.

As shown, the upper housing 105 forms part of an enclosure of the bait station 100, and animals can enter the enclosure through the animal opening 115 formed in the upper housing 105. Upon entering the enclosure, the animal walks onto a ramp 200, which forms a bottom surface of the enclosure. In an illustrative embodiment, the ramp 200 includes a non-slip walking surface such that the animal does not slide or slip while walking on the ramp. Such slipping can potentially frighten the animal, resulting in them leaving the enclosure before accessing the bait. The non-slip walking surface can be formed by placing textures on the ramp, by covering the ramp with a sheet of textured rubber/plastic material, by placing small perforations or openings in the ramp, etc.

A distal end of the ramp includes a wall 205 with an opening 210 therein. The opening 210 is sized to receive at least a head of the target animal such that the animal can access the bait through the opening 210. When the ramp is in its initial position (i.e., without an animal's weight present), the opening 210 is adjacent to a surface. As a result, an animal cannot access bait through the opening 210 when the ramp is in the initial position. The surface adjacent to the opening 210 can be part of a bait hopper 215 that holds and dispenses the bait in one embodiment. Alternatively, the surface can be part of a wall formed adjacent to the bait hopper 215 that forms a portion of a bait access chamber.

In an illustrative embodiment, a portion of the enclosure formed by the upper housing 105 and the ramp 200 is formed by a wall 220 at a distal end of the chamber. The wall 220 prevents the animal from accessing the bait hopper 215, while also allowing airflow from the bait hopper 215 into the chamber via perforations (or other openings) formed in the wall 220. As a result, the target animal is able to smell the bait within the chamber, which provides motivation for the target animal to venture into the bait station and to access the bait.

In another illustrative embodiment, if the weight of the target animal exceeds the target animal weight threshold, the weight of the target animal will cause the distal end of the ramp to drop down, placing the ramp is an active position in which the opening 210 aligns with an opening 225 in the bait hopper 215 (or the bait access chamber), thereby allowing the target animal to access the bait. Specifically, in one embodiment, a rod 230 extends laterally through an opening in the body of the ramp 220, as best shown in FIG. 2C. The ends of the rod 230 mount to the lower housing 105 such that the rod 230 acts as a fulcrum for the ramp 220. As the target animal approaches the distal end of the ramp 220, the distal end of the ramp rotates downward until the distal end of the ramp 220 contacts a ledge 235 that is mounted to a bottom portion of the bait hopper 215. The ledge 235 acts as a stop that results in the opening 210 in the wall 205 aligning with the opening 225 in the bait hopper 215 or the bait access chamber.

Figure 3:
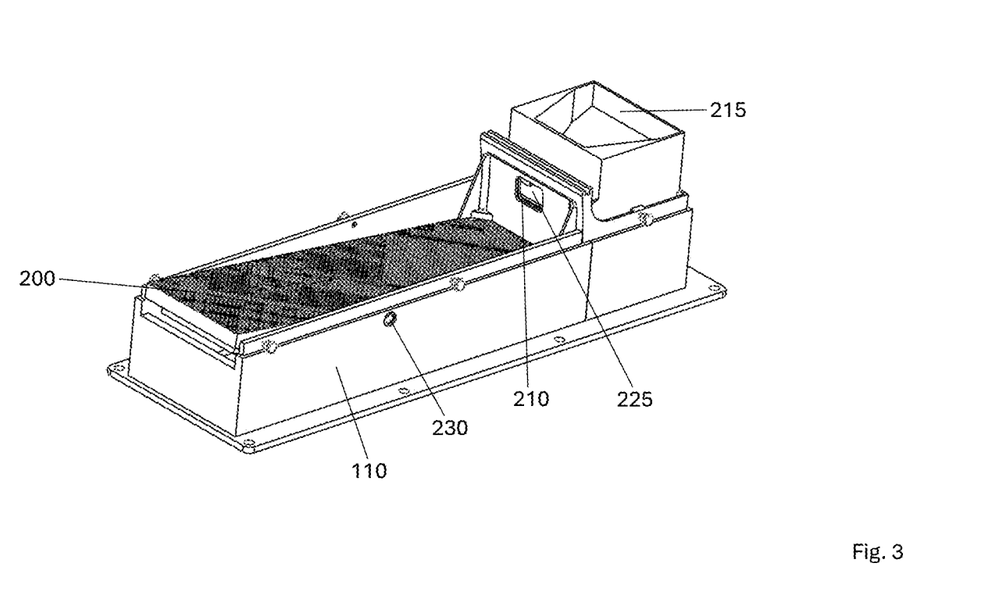
FIG. 3 is a perspective view of the bait station with the upper housing removed and the ramp in an active (i.e., lowered) position in accordance with an illustrative embodiment.

FIG. 3 is a perspective view of the bait station 100 with the upper housing removed and the ramp in an active (i.e., lowered) position in accordance with an illustrative embodiment. In this position, the target animal can extend its head through the aligned openings (or doors) to access the bait in the bait access chamber. The ramp will remain in this position as long as the target animal remains at the distal end of the enclosure.

The system is designed prevent most other animals (i.e., other than the target animal) from being able to access the bait. For example, if the animal is too large it will not fit into the animal opening 115, and will therefore be unable to access the chamber or the bait. If the animal is too small and does not weigh enough, the ramp 200 will not travel from the initial position to the active position, and the animal not be able to access the bait. In an illustrative embodiment, a user can control the amount of weight (i.e., the target animal weight threshold) that is needed to move the ramp 200 from the initial position to the active position in which the bait is accessible. The weight control for the ramp can be implemented in different ways depending on the embodiment.

In one embodiment, the ramp includes a ramp weight 240 mounted to a bottom side of the ramp 200. The ramp weight 240 holds the ramp 200 in the initial position and controls the amount of weight that it takes to cause the ramp to transition from the initial position to the active position (i.e., the tipping weight). As shown, the ramp weight 240 is secured to a bottom of the ramp 200 via a pin 245, which can be a rod with flared ends. In an illustrative embodiment, one end of the pin 245 mounts to the ramp weight 240 and a second end of the pin 245 mounts to a track 250 formed in a bottom of the ramp 200. By moving the ramp weight 240 along the track 250, the tipping weight of the ramp 200 can be controlled. For example, sliding moving the pin 245 in a distal direction down the track 250 (i.e., towards the bait hopper) results in less weight being needed to tip the ramp 200, and sliding the moving pin 245 in a proximal direction down the track (i.e., towards the animal opening) results in more weight being needed to tip the ramp 200. In one embodiment, the pin 245 can be or can include a set screw or other fastener that allows the position of the ramp weight 240 to be locked in place on the bottom of the ramp 200. By loosening the set screw, a user can slide the ramp weight 240 and the pin 245 along the track 250 to adjust the tipping point of the ramp 200. Once the ramp weight 240 is in a desired position, the user can tighten the set screw to lock the weight 240 into place.

In one embodiment, a bottom of the ramp 200 can include visual indicators that label various positions along the track 250 that receives the ramp weight 240. For example, a first visual indicator can indicate a position that the ramp weight 240 should be placed to target a first target animal (e.g., a red squirrel) based on the known weight of the first target animal, a second visual indicator can indicate a position that the ramp weight should be placed to target a second animal (e.g., a gray squirrel) based on the known weight of the second target animal, etc. The visual indicators can be lines that are labeled, symbols corresponding to target animals, etc. As best shown in FIG. 2C, a bottom of the lower housing 110 includes openings 255 that allow a user to access the bottom of the ramp 200 such that the position of the ramp weight 240 can be easily changed without disassembling the device.

In an alternative embodiment, the pin 245 can be a fastener such as a screw, bolt, etc. and the ramp weight 240 can be mounted stationary to the bottom of the ramp such that the weight is unable to slide along the bottom of the ramp 200. In such an embodiment, the ramp weight 240 can be swapped out with a heavier or lighter weight to control the tipping weight for the ramp 200. For example, a heavier weight can be used for target animals that weigh more, and a lighter weight can be used for target animals that weigh less. In another alternative embodiment, instead of using a weight that is repositionable along the bottom of the ramp 200, the system can use a plurality of different mounting locations for the rod 230 to shift the fulcrum for the ramp 200, thereby controlling the tipping weight needed to transition the ramp 200 from the initial position to the active position. For example, the ramp 200 can include a plurality of different openings that extend laterally therethrough, and that are sized to receive the rod 230. The lower housing 110 can similarly include a series of openings sized to receive the ends of the rod 230. By moving the rod 230 from a first opening in the ramp to a second opening in the ramp changes the position of the ramp fulcrum, which changes the amount of weight needed to tip the ramp 200.

Figure 4A:
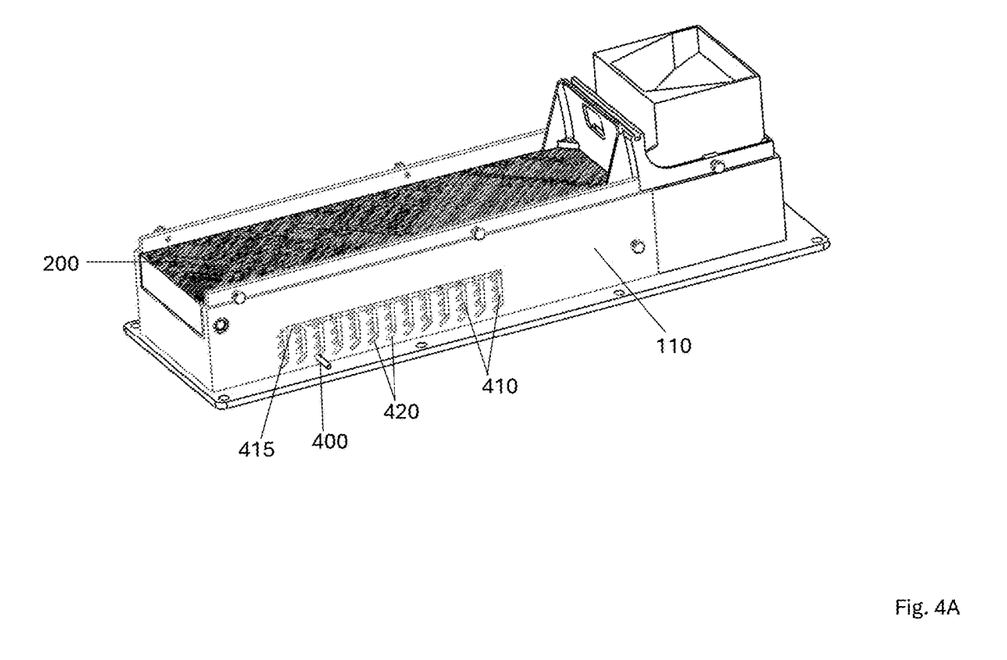
FIG. 4A is a side view of the bait station showing a control lever for use in adjusting the tipping weight of the ramp in accordance with an illustrative embodiment.
Figure 4B:
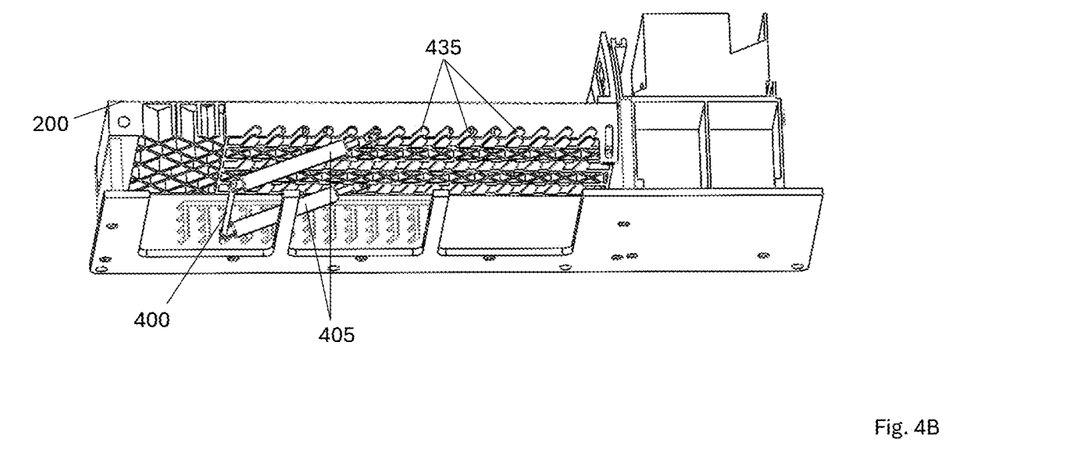
FIG. 4B is a cross-sectional perspective bottom view of the bait station showing repositionable hydraulic arms that can be used to adjust the tipping weight of the ramp in accordance with an illustrative embodiment.
Figure 4C:
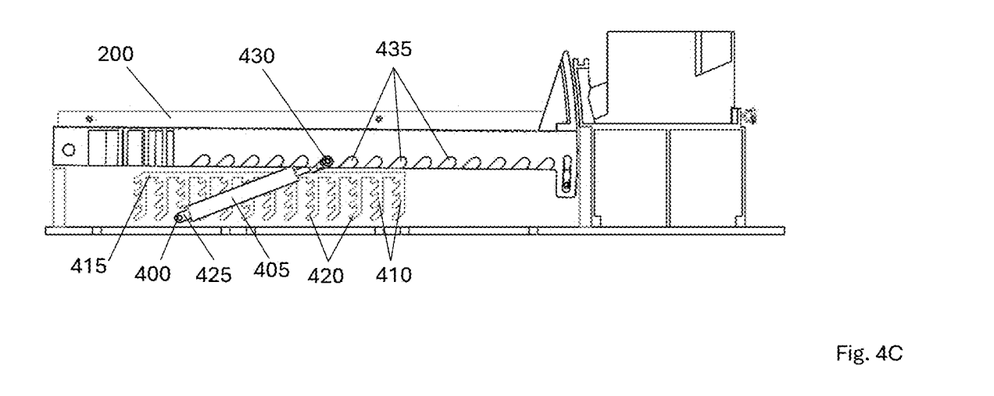
FIG. 4C is a cross-sectional side view of the bait station showing repositionable hydraulic arms that can be used to adjust the tipping weight of the ramp in accordance with an illustrative embodiment.

In another alternative embodiment, instead of using a slidable or replaceable ramp weight to control the tipping weight (i.e., target animal weight threshold) of the ramp 200, one or more hydraulic arms can be used to control the tipping point. In another alternative embodiment, the one or more hydraulic arms can be used in conjunction with a slidable or replaceable ramp weight to control the tipping weight for the ramp 200. FIG. 4 depicts an embodiment of a bait station with repositionable hydraulic arms to control the tipping weight of the ramp. Specifically, FIG. 4A is a side view of the bait station showing a control lever 400 for use in adjusting the tipping weight of the ramp 200 in accordance with an illustrative embodiment. FIG. 4B is a cross-sectional perspective bottom view of the bait station showing repositionable hydraulic arms 405 that can be used to adjust the tipping weight of the ramp 200 in accordance with an illustrative embodiment. FIG. 4C is a cross-sectional side view of the bait station showing repositionable hydraulic arms 405 that can be used to adjust the tipping weight of the ramp 200 in accordance with an illustrative embodiment.

In the embodiment of FIG. 4, a plurality of different vertical slots 410 are formed in each side of the lower housing 110 and are sized to receive the control lever 400 so that it can be repositioned. Each of the vertical slots 410 ties into a horizontal slot 415 that allows the control lever 400 to be moved along the length of the ramp 200. Additionally, each of the vertical slots 410 includes a plurality of angled slots 420 extending therefrom that hold the control lever 400 in a desired position. FIG. 4 shows 13 vertical slots 410 and 4 angled slots 420 extending from each vertical slot. It is to be understood that in alternative embodiments, a different number of vertical slots 410 and/or angled slots 420 may be used.

The hydraulic arms 405 each have a proximal end 425 and a distal end 430. The proximal end 425 is mounted to the control lever 400, and the ends of the control lever 400 are positioned into a set of the angled slots 420 (i.e., one angled slot on each side of the lower housing 110). By moving the position of the control lever 400 from a first set of angled slots to a second set of angled slots, the tipping weight of the ramp can be controlled. Additionally, a bottom of the ramp 200 includes a plurality of slots 435, and the distal end 430 of the hydraulic arms 405 is mounted into one of these slots 435. By moving the position of the distal ends of the hydraulic arms 405 from a first slot 435 to a second slot 435, the tipping weight of the ramp can be further controlled.

In the embodiment shown, there are 2 hydraulic arms 405 used. In alternative embodiments, fewer (e.g., 1) or additional (e.g., 3, 4, etc.) hydraulic arms can be used to control the tipping weight of the ramp 200. In addition to controlling the tipping weight and allowing the ramp 200 tip in response to a target animal walking on the ramp, the hydraulic arm(s) are also used to move the ramp 200 back into the initial position from the active position when the target animal exits the enclosure. In one embodiment, the side(s) of the lower housing can include visual indicators that indicate how movement of the control lever 400 will change the tipping weight of the ramp 200. The visual indicators, can be indications of a type of target animal, indications of a tipping weight for a given control lever position, etc.

Figure 5:
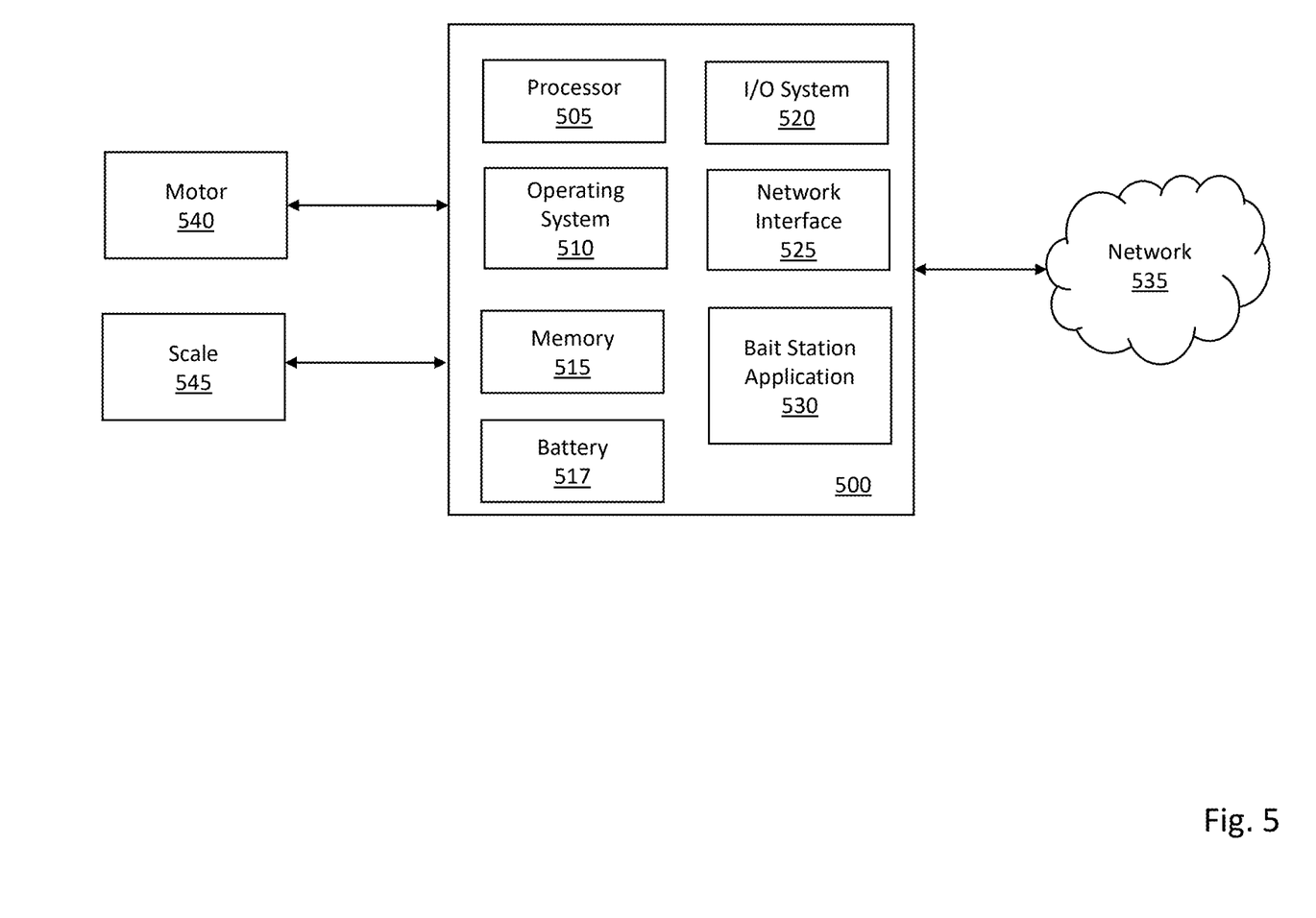
FIG. 5 is a block diagram of a computing system to run a bait station in accordance with an illustrative embodiment.

In another alternative embodiment, the bait station can use a computer system to control movement of the ramp 200 and/or to adjust the tipping weight of the ramp 200. In such an embodiment, the computing system can be used to perform any of the operations described herein. As an example, FIG. 5 is a block diagram of a computing system 500 to run a bait station in accordance with an illustrative embodiment. In one embodiment, the computing system 500 is in direct communication with a motor 540 that controls movement of the ramp described herein. Any type of motor or other actuator may be used. The computing system 500 is also in control with a scale 545 that determines a weight of an animal present on the ramp of the bait station. Any type of electronic or digital scale may be used. In an embodiment in which the computing system 500 is remote from the bait station, the computing system 500 can communicate with the motor 540 and/or the scale 545 through a network 535.

The computing system 500 includes a processor 505, an operating system 510, a memory 515, a battery 517 to power the computing components and/or the motor 540, an input/output (I/O) system 520, a network interface 525, and a bait station application 530. In alternative embodiments, the computing system 500 may include fewer, additional, and/or different components. The components of the computing system 500 communicate with one another via one or more buses or any other interconnect system.

The processor 505 can be in electrical communication with and used to control any of the system components described herein. For example, the processor 505 can be used to execute the bait station application 530, process received weight readings from the scale 545, control the motor 540 or other actuator to adjust the ramp position, etc. The processor 505 can be any type of computer processor known in the art, and can include a plurality of processors and/or a plurality of processing cores. The processor 505 can include a controller, a microcontroller, an audio processor, a hardware accelerator, a digital signal processor, etc. Additionally, the processor 505 may be implemented as a complex instruction set computer processor, a reduced instruction set computer processor, an x86 instruction set computer processor, etc. The processor 505 is used to run the operating system 510, which can be any type of operating system.

The operating system 510 is stored in the memory 515, which is also used to store programs, user data, network and communications data, peripheral component data, the bait station application 530, and other operating instructions. The memory 515 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 515 can be in the cloud to provide cloud storage for the system. Similarly, in one embodiment, any of the computing components described herein (e.g., the processor 505, etc.) can be implemented in the cloud such that the system can be run and controlled through cloud computing.

The I/O system 520 is the framework which enables users and peripheral devices to interact with the computing system 500. The I/O system 520 can include a display, one or more speakers, one or more microphones, a keyboard, a mouse, one or more buttons or other controls, etc. that allow the user to interact with and control the computing system 500. The I/O system 520 also includes circuitry and a bus structure to interface with peripheral computing devices such as the battery 517 or other power sources, universal service bus (USB) devices, data acquisition cards, peripheral component interconnect express (PCIe) devices, serial advanced technology attachment (SATA) devices, high definition multimedia interface (HDMI) devices, proprietary connection devices, etc.

The network interface 525 includes transceiver circuitry (e.g., a transmitter and a receiver) that allows the computing system 500 to transmit and receive data to/from other devices, remote computing systems, servers, websites, etc. The network interface 525 enables communication through the network 535, which can be one or more communication networks. The network 535 can include a cable network, a fiber network, a cellular network, a wi-fi network, a landline telephone network, a microwave network, a satellite network, etc. The network interface 525 also includes circuitry to allow device-to-device communication such as Bluetooth® communication.

The bait station application 530 can include software and algorithms in the form of computer-readable instructions which, upon execution by the processor 505, performs any of the various operations described herein such as receiving a target animal or target animal weight to control the tipping weight of the ramp, operating the scale 545 to determine an amount of weight present on the scale, comparing the weight from the scale 545 to a tipping weight threshold associated with the target animal, controlling the motor 540 or other actuator to tip the ramp from the initial position to the active position if the measured weight exceeds the tipping weight threshold, controlling the motor to move the ramp back from the active position to the initial position once the measured weight is removed from the ramp, automatically releasing a portion of bait from the bait hopper in response to the ramp moving from the initial position to the active position, etc. The bait station application 530 can utilize the processor 505 and/or the memory 515 as discussed above. In an alternative implementation, the bait station application 530 can be remote or independent from the computing system 500, but in communication therewith.

Figure 6:
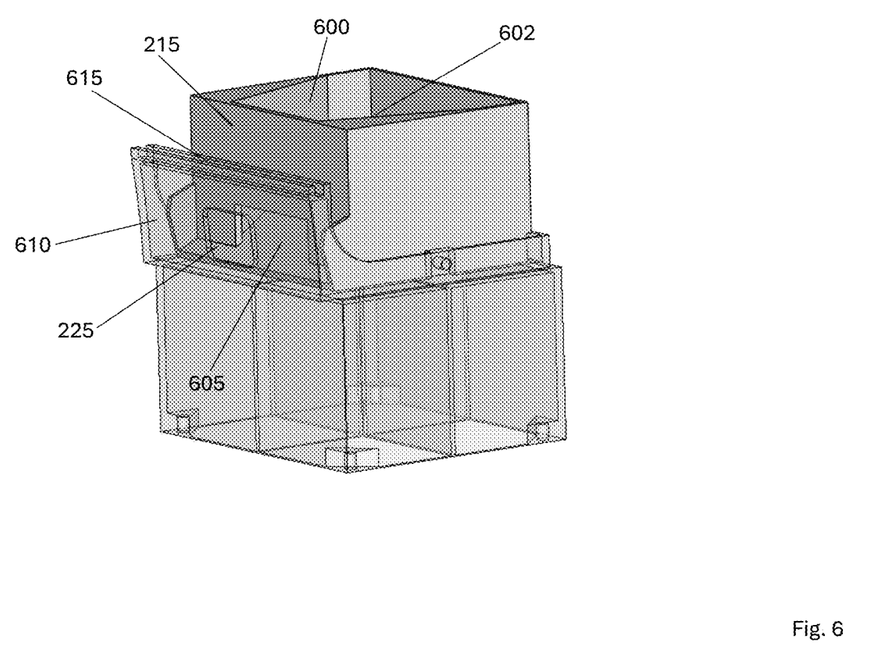
FIG. 6 is a perspective view of the bait hopper in accordance with an illustrative embodiment.

FIG. 6 is a perspective view of the bait hopper 215 in accordance with an illustrative embodiment. In the view of FIG. 6, portions of the bait hopper are transparent such that the various features of the bait hopper are visible. As shown, the bait hopper 215 includes a bait storage container 600 having a tapered bottom wall 602 that causes bait to travel from the bait storage container 600 through an opening and into a bait access chamber 605. When bait is removed from the bait access chamber 605, additional bait can fall into place in the chamber via gravity due to the tapered bottom wall 602 of the bait storage container 600. The bait access chamber 605 is formed in part by an exterior wall of the bait storage container 600 and in part by a wall 610 that includes the opening 225. As discussed above, when the ramp is properly weighted, the distal end of the ramp is lowered such that the opening 210 aligns with the opening 225, at which point the target animal has access to the bait access chamber 605. As also shown, the wall 610 includes a groove 615 that is sized to receive the wall 220 described herein with reference to FIG. 2.

In an alternative embodiment, the bait hopper 215 of the bait station can be used to precisely control an amount of the bait that is delivered into the bait access chamber 605 each time the ramp 200 is lowered into the active position. In such an embodiment, the bait may include a vaccine, medicine, or poison in which the applied dose is important to ensure efficacy. In one embodiment, the bait can be in the form of spheres, similar to gumballs. A gumball dispenser mechanism, pinball dispenser mechanism, or other dispenser mechanism can be used to selectively dispense a single bait sphere into the bait access chamber 605 each time the ramp is activated.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A bait station system comprising:
   an enclosure formed in part by an upper housing;
   a ramp that forms a bottom wall of the enclosure, wherein the ramp moves from an initial position to an active position in response to a weight that exceeds a target animal weight threshold applied to the ramp;
   a bait hopper that holds bait; and
   a bait access chamber that receives the bait from the bait hopper and that is only accessible from within the enclosure while the ramp is in the active position due to the weight applied to the ramp.

2. The system of claim 1, further comprising an opening that extends laterally through the ramp, wherein the opening is sized to receive a rod that acts as a fulcrum for the ramp.

3. The system of claim 2, further comprising a lower housing that mounts to the upper housing, wherein the lower housing includes openings that receive ends of the rod that acts as the fulcrum for the ramp.

4. The system of claim 1, further comprising a ramp weight mounted to a bottom surface of the ramp.

5. The system of claim 4, further comprising a pin that secures the ramp weight to the bottom surface of the ramp.

6. The system of claim 5, further comprising a slot formed in a bottom surface of the ramp, wherein the slot is sized to slidably receive the pin such that the pin and the ramp weight can be moved along the slot to adjust a position of the ramp weight to control a tipping weight for the ramp.

7. The system of claim 6, further comprising one or more visual indicators along the slot, and wherein the position of the ramp weight corresponds to a target animal identified by one of the one or more visual indicators.

8. The system of claim 5, wherein the pin includes a set screw that locks the pin and the weight at a desired position.

9. The system of claim 4, further comprising a lower housing that mounts to the upper housing, and further comprising one or more access openings in a bottom wall of the lower housing, wherein the one or more access openings provide access to the ramp weight such that the weight can be repositioned along the bottom surface of the ramp.

10. The system of claim 1, further comprising an animal opening in the upper housing that allows a target animal to enter the enclosure, wherein a size of the animal opening is based on a size of the target animal to prevent larger animals from entering the enclosure.

11. The system of claim 1, further comprising a first wall mounted to a distal end of the ramp, wherein the first wall includes an opening.

12. The system of claim 11, wherein the opening in the first wall is adjacent to a wall of the bait access chamber when the ramp is in the initial position, and wherein the opening in the first wall is adjacent to an opening in the bait access chamber when the ramp is in the active position.

13. The system of claim 11, further comprising a second wall at the distal end of the enclosure, wherein the second wall is adjacent to the bait hopper, and wherein the second wall includes one or more openings to allow scent from the bait to enter the enclosure.

14. The system of claim 1, wherein the bait hopper includes a tapered bottom wall that causes bait to travel from the bait hopper into the bait access chamber.

15. The system of claim 1, wherein movement of the ramp from the initial position to the active position causes the bait hopper to release a single dose of bait into the bait access chamber.

16. A method of forming a bait station, the method comprising:
    forming a portion of an enclosure by an upper housing that is attached to a lower housing;
    mounting a ramp to one or both of the lower housing and the upper housing such that the ramp forms a bottom wall of the enclosure, wherein the ramp is movable from an initial position to an active position in response to a weight that exceeds a target animal weight threshold applied to the ramp;
    mounting a bait hopper that holds bait adjacent to the ramp; and
    forming a bait access chamber that receives the bait from the bait hopper, wherein the bait access chamber is only accessible from within the enclosure while the ramp is in the active position due the weight applied to the ramp.

17. The method of claim 16, further comprising mounting a ramp weight to a bottom surface of the ramp such that a position of the ramp weight controls a tipping weight of the ramp.

18. The method of claim 17, further comprising forming a slot in the bottom surface of the ramp, wherein the slot is sized to slidably receive a pin that holds the ramp weight such that the pin and the ramp weight can be moved along the slot to adjust the position of the ramp weight to control the tipping weight for the ramp.

19. The method of claim 16, wherein mounting the ramp includes forming a lateral opening through the ramp and mounting a rod through the lateral opening such that the rod acts as a fulcrum for the ramp.

20. The method of claim 16, further comprising forming an animal opening in the upper housing that allows a target animal to enter the enclosure, wherein a size of the animal opening is based on a size of the target animal to prevent larger animals from entering the enclosure.

* * * * *